United States Patent [19]

Zupanovich et al.

[11] 4,375,526
[45] Mar. 1, 1983

[54] ANIONIC POLYMERS FOR REDUCTION OF VISCOSITY OF A MAGNESIUM HYDROXIDE FILTER CAKE PASTE

[75] Inventors: John D. Zupanovich; John G. Myers, both of Pittsburgh; Jerry L. Walker, Coraopolis, all of Pa.

[73] Assignee: Calgon Corporation, Pittsburgh, Pa.

[21] Appl. No.: 323,329

[22] Filed: Nov. 20, 1981

[51] Int. Cl.³ .................................................. C08K 3/22
[52] U.S. Cl. .................................................... 524/436
[58] Field of Search ................................ 524/433, 436

[56] References Cited

U.S. PATENT DOCUMENTS

| | | | |
|---|---|---|---|
| 3,962,267 | 6/1976 | Suzuki | 524/433 |
| 4,179,383 | 12/1979 | Cheng et al. | 252/25 |
| 4,229,309 | 10/1980 | Cheng et al. | 252/25 |
| 4,230,610 | 10/1980 | Falcione et al. | 260/29.6 |

OTHER PUBLICATIONS

Kirk-Othmer, Encyclopedia of Chemical Technology, 2nd Edition, vol. 12, pp. 724–730 (1969).
"Effect of Hydroxy-Magnesium Injection for Preventing High/Low Temperature Corrosion of Heavy Oil Firing Boilers", Aramaki, Mikio et al., Technical Review, May 1960.
"Polymeric Organic Dispersants for Pigments: Useful Structures in their Evaluation", Athey, Robert D., Jr., Tappi, Oct. 1975, vol. 58, No. 10, pp. 55–61.

*Primary Examiner*—Paul R. Michl
*Attorney, Agent, or Firm*—Martin L. Katz; R. Brent Olson

[57] ABSTRACT

The instant invention is directed to a method for reducing the viscosity of magnesium hydroxide filter cake paste which comprises adding an anionic polymer or copolymer to the magnesium hydroxide filter cake paste. The instant invention is also directed to a stable magnesium hydroxide dispersion comprising an anionic polymer, water and magnesium hydroxide.

1 Claim, No Drawings

ANIONIC POLYMERS FOR REDUCTION OF VISCOSITY OF A MAGNESIUM HYDROXIDE FILTER CAKE PASTE

BACKGROUND OF THE INVENTION

This invention relates to the use of anionic polymers to reduce the viscosity of a magnesium hydroxide filter cake paste.

Magnesium hydroxide is obtained from seawater by precipitation with the addition of dolomite. Its principal use is as a highly pure powder for use in toothpaste, anti-acid formulations and as a coating to silicon steel. Less pure grades of magnesium hydroxide have been used in slurry form as a fuel oil additive.

It is necessary to reduce the viscosity of magnesium hydroxide filter cake pastes in order to make it pumpable. The viscosity has previously been reduced by the addition of water. The addition of water reduces the active concentration. The magnesium hydroxide will not remain suspended and, once settled, more difficult to move through a delivery pipe.

It is an object of the instant invention to produce a stable dispersion or suspension, reduce the viscosity and maintain the active concentration.

It is known to use neutralized polyacrylic acid to reduce the viscosity of magnesium oxide aqueous slurries (U.S. Pat. No. 4,230,610). However, magnesium oxide is obtained from the ore, magnesite. This is a completely different art. The methods of recovery are unrelated.

DESCRIPTION OF THE INVENTION

The instant invention is directed to a method for reducing the viscosity of magnesium hydroxide filter cake paste which comprises adding an anionic polymer or copolymer to the magnesium hydroxide filter cake paste.

The instant invention is also directed to a stable magnesium hydroxide dispersion or suspension comprising an anionic polymer, water and magnesium hydroxide.

Any anionic polymer, including copolymers, may be used. The most common anionic polymers contain carboxylic, sulfonic or phosphonic functional groups. Examples include polyacrylic acid; polymethacrylic acid; hydrolyzed polyacrylic esters, amides, or nitriles, polystyrenesulfonate, polyvinylsulfonate, polyvinyl phosphonate, inorganic polyphosphates and organic polyphosphate esters or mixtures thereof.

The dosage of anionic polymer used is dependent solely on economics. From an economic standpoint, it is preferred to use 1.4 to 5 percent anionic polymer to preferably a 10 to 90%, most preferably 37 to 60%, hydroxide paste.

The pH of the polymer should be about 6.8 to 8.0.

The preferred anionic polymers are polyacrylate and copolymers of ethylene and maleic anhydride. The preferred molecular weight of the anionic homopolymer polyacrylate (in salt form) is about 750 to 15,000.

Mixtures of anionic homopolymers and copolymers may be used.

It was found that the magnesium hydroxide slurry remained dispersed upon the addition of anionic polymer.

The polymer is added to the magnesium hydroxide precipitate after precipitation and separation.

EXAMPLES

The pH of the polymers used in the Examples was adjusted to 6.8 by the addition of sodium hydroxide.

Various anionic polymers were added to the amounts indicated in Table 1 to magnesium hydroxide filter cake (32% solids) to obtain 300 g of product. The ingredients were mixed thoroughly for 60 seconds and the viscosity was measured. The results are summarized in Table I. The mixtures containing polymer were observed after one month of storage. The dispersions were still stable with very little settling. The mixture containing added water had substantial settling after only 12 hours. The filter cake paste (32%) solids showed substantial settling after several days of sitting.

TABLE I

Mg(OH)$_2$ Formulations

| Additive | Percent Additive, by Weight | Brookfield Viscosity (CPS) |
|---|---|---|
| none | — | 17,000–24,000 |
| water | 55 | 9,600 |
| polyacrylic acid (MWT 5,800) | 1.4 | 640 (550 after 24 hrs., 570 after 48 hrs.) |
| polyacrylic acid (MWT 15,000) | 2.0 | 900 |
| polyethylene maleic anhydride (MWT 8,000) | 4.0 | 220 |
| polyethylene maleic anhydride (MWT 8,000) | 4.5 | 240 |
| polyethylene maleic anhydride (MWT 8,000) | 5.0 | 225 |
| 10% polyacrylic acid (MWT 15,000)/ 90% polyethylene maleic anhydride (MWT 8,000) | 4.0 | 225 |

What is claimed is:

1. A method for reducing the viscosity of magnesium hydroxide filter cake paste which comprises adding a copolymer of ethylene and maleic anhydride to the magnesium hydroxide filter cake paste.

* * * * *